May 6, 1969     J. YOUHOUSE     3,442,077
AFTERBURNER TURBINE FOR INTERNAL COMBUSTION ENGINES
Filed May 11, 1967

INVENTOR.
JOSEPH YOUHOUSE

May 6, 1969

J. YOUHOUSE 3,442,077

AFTERBURNER TURBINE FOR INTERNAL COMBUSTION ENGINES

Filed May 11, 1967

INVENTOR.
JOSEPH YOUHOUSE
BY

May 6, 1969     J. YOUHOUSE     3,442,077
AFTERBURNER TURBINE FOR INTERNAL COMBUSTION ENGINES
Filed May 11, 1967
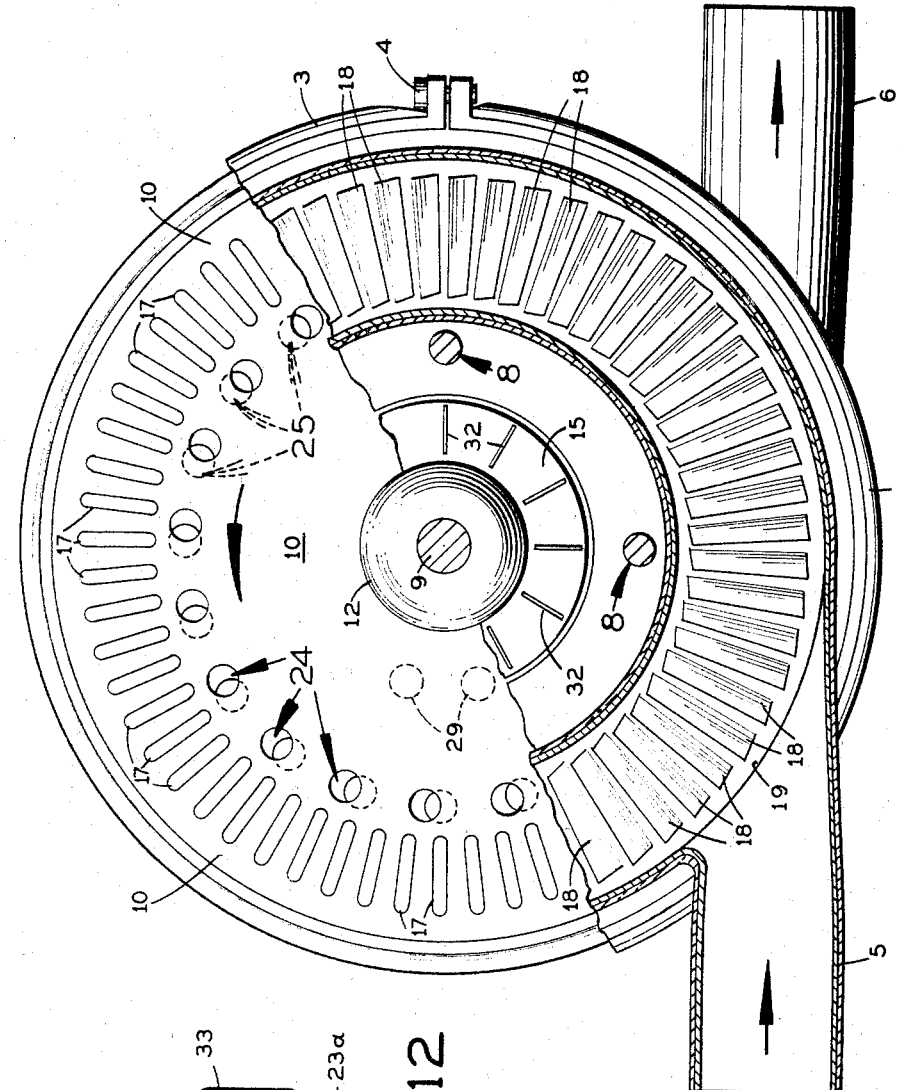
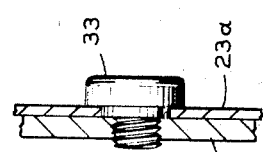
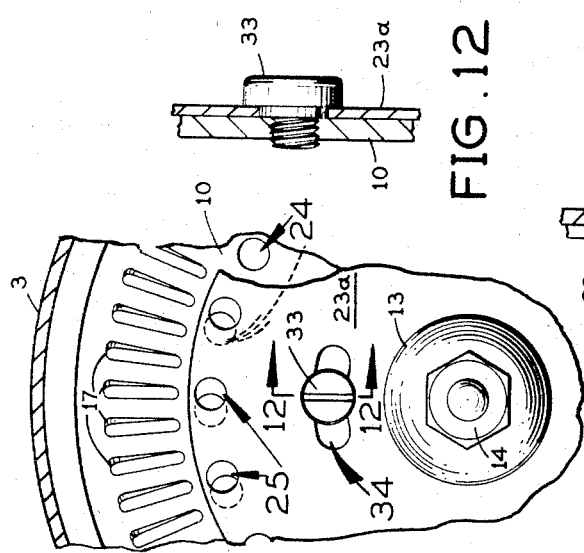
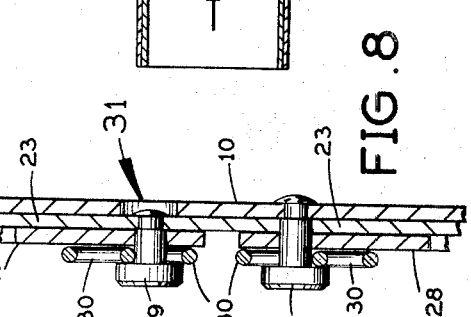
INVENTOR.
JOSEPH YOUHOUSE May 6, 1969  J. YOUHOUSE  3,442,077
AFTERBURNER TURBINE FOR INTERNAL COMBUSTION ENGINES
Filed May 11, 1967  Sheet 4 of 4
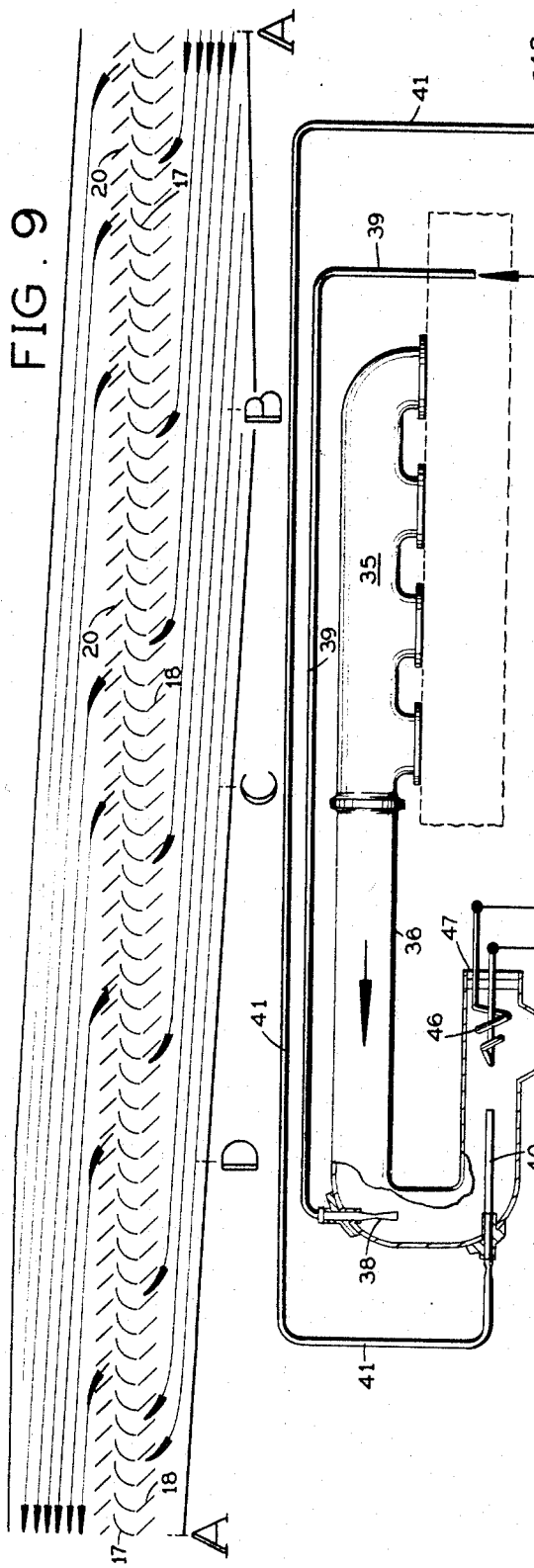
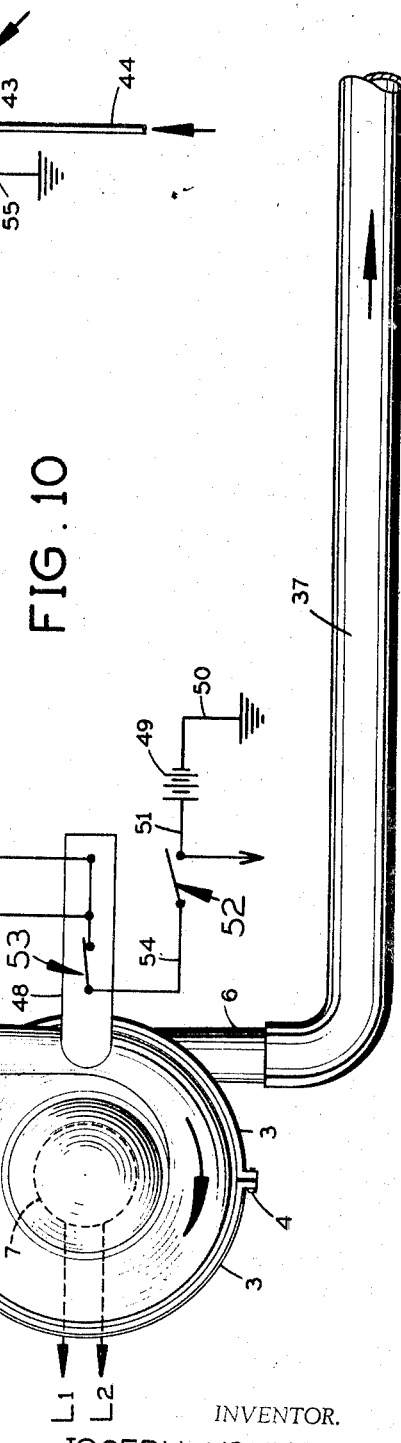
INVENTOR.
JOSEPH YOUHOUSE
BY

United States Patent Office 3,442,077
Patented May 6, 1969

3,442,077
AFTERBURNER TURBINE FOR INTERNAL COMBUSTION ENGINES
Joseph Youhouse, 4885 SW. 118th Ave.,
Miami, Fla. 33165
Filed May 11, 1967, Ser. No. 637,666
Int. Cl. F01n 1/14, 1/18, 3/14
U.S. Cl. 60—13                                    8 Claims

ABSTRACT OF THE DISCLOSURE

A combination afterburner and turbine attachment for the exhaust system of an internal combustion engine for converting noxious gases into harmless gases, furnishing auxiliary electric power and muffling the acoustical output of the exhaust system.

---

This invention in general relates to apparatus for reducing smog pollution of the atmosphere and particularly related to exhaust systems for internal combustion engines and more particularly to a combination afterburner and turbine means connected to the exhaust manifold of an internal combustion engine for burning noxious gases and simultaneously driving a turbine for producing auxiliary power from the engine and simultaneously reducing the noise level from an exhaust system.

Prior devices for reducing the noxious gas output of exhaust systems employ catalysts for chemically changing unburned hydrocarbons, carbon monoxide, and oxides of nitrogen and gasoline commonly present in the exhaust system to harmless products, such as carbon dioxide. The efficiency of the catalyst type converter is relatively low and rapidly deteriorates in effectiveness and requires frequent reconditioning and are also relatively expensive to manufacture.

Another well known means for minimizing the noxious gas output of exhaust systems comprehends the use of electric spark or other ignition means for igniting the carbon monoxide gas and other hydrocarbons in the exhaust system into non-noxious gas, such as carbon dioxide. These systems generally fail for many well known reasons, including the high velocity travel of the gases through the afterburner, prohibiting complete combustion of the combustible products.

The present invention overcomes the above objections and disadvantages by the provision of a combination air and/or fuel fed afterburner in combination with a gas turbine, which effectively converts noxious gas into harmless products of combustion and simultaneously drives a turbine for producing auxiliary power and also provides an effective muffling device for reducing the noise output of the exhaust system, the construction of which provides three principal objects of the invention.

A further object of the invention is the provision of a glow plug including an electric heater element positioned in the exhaust conduit of the exhaust manifold for igniting the noxious products of combustion flowing in the conduit including a means for injecting air into the conduit in close proximity to the glow plug for maintaining the combustion and conversion of noxious products of combustion in the exhaust gases from the exhaust manifold.

Another object of the invention is the provision of the combination of two nozzle means connected in the exhaust system of an internal combustion engine in which a first nozzle will induce air in said system from the flow of exhaust gas from a manifold, from which the oxygen induced will support the afterburner combustion and wherein a second nozzle will induce noxious gases from the crankcase of the engine for ignition and burning to non-noxious gas, by an afterburner in the exhaust system.

Another object of the invention is the provision of an electric heater element constructed of materials to resist the impingement of exhaust flame thereon from the exhaust manifold for maintaining the ignition temperature of the combustible component of the gases from the manifold following a short period of electric heating for starting purposes.

A further object of the invention is the provision of a turbine means positioned in the exhaust system with the inlet thereof connected to the exhaust manifold of the engine and the output conducted to the atmosphere with the rotor of the turbine connected to and adapted to drive an auxiliary device, such as an electric generator.

Another object of the invention is a centrifugal spoiler means in said turbine means operated by the rotor thereof for bypassing exhaust gases by the latter in proportion to the input velocity of the gases from the exhaust of an internal combustion engine for holding the speed of the rotor substantially constant.

These and other objects and advantages in one embodiment of the invention are described and shown in the following specification and drawings, in which:

FIG. 7 is a cross sectional view taken through section line 7—7, FIG. 1.

FIG. 8 is a cross sectional end view taken through section line 8—8, FIG. 6.

FIG. 9 is a linear development diagram of the blade arrangement in the turbine shown in FIG. 1.

FIG. 10 is a schematic diagram of the combination afterburner and turbine means connected to a typical exhaust manifold.

FIG. 11 is a partial view showing a modification of the turbine.

FIG. 12 is a side partial sectional view taken through section line 12—12 in FIG. 11.

Figure 1:
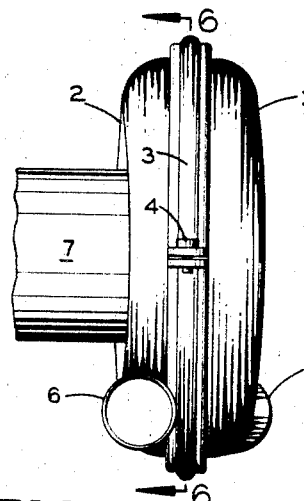
FIG. 1 is an end elevation of an exhaust gas operated turbine directly connected to a fragmentary side view of an electric generator, in reduced scale.
Figure 2:
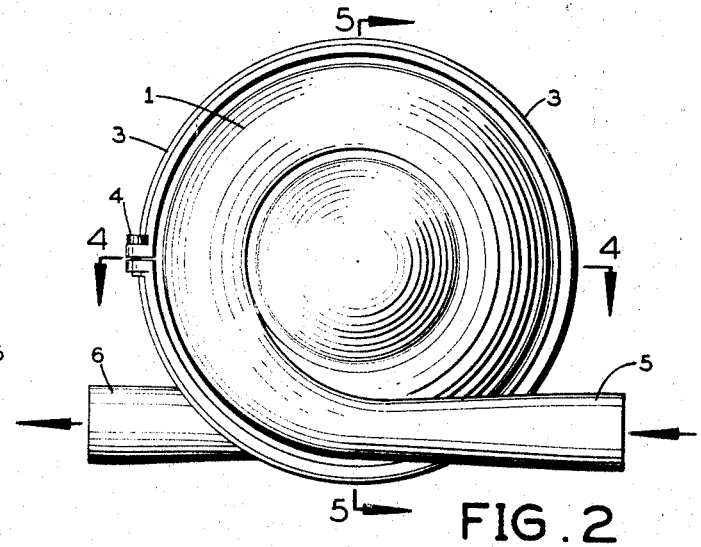
FIG. 2 is a front elevation of the turbine shown in FIG. 1.
Figure 3:
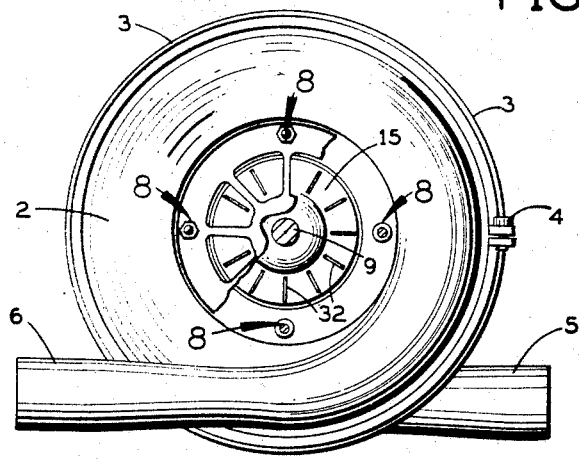
FIG. 3 is a rear elevation of the turbine shown in FIG. 1 with a portion thereof broken away.

Referring to FIGS. 1, 2, and 3, a reaction type turbine is adapted to be driven by the flow of exhaust gas from an internal combustion engine manifold, which comprises a casing consisting of a circular inlet housing 1 and a circular outlet housing 2 retained in adjacent sealed position by a clamp ring 3, which ring is secured by screw means 4, as shown. The inlet and outlet housings 1 and 2 are provided with integral inlet and outlet cylindrical connetcions 5 and 6, respectively.

Figure 4:
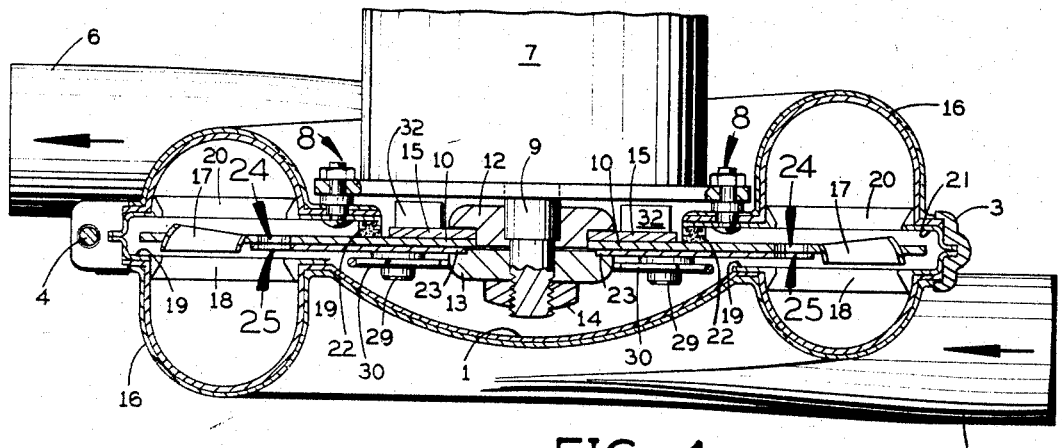
FIG. 4 is a fragmentary enlarged cross sectional view taken through section line 4—4, FIG. 2.

An electric generator 7, having predetermined characteristics, is coaxially secured to the outlet housing 2 by screw means 8, best shown in FIGS. 3 and 4.

Referring to FIG. 4, the shaft 9 of the generator 7 journalled therein supports the rotor member 10 and the spoiler plate, to be hereinafter described, between two hubs 12 and 13, which are retained by a nut 14 threaded on the end of the shaft, as shown. The hub 12 also retains a conventional multi-blade radial fan member 15, which will draw air through the generator for radial distribution from the outlet housing of the turbine for cooling both the generator and the turbine when operated.

Figure 5:
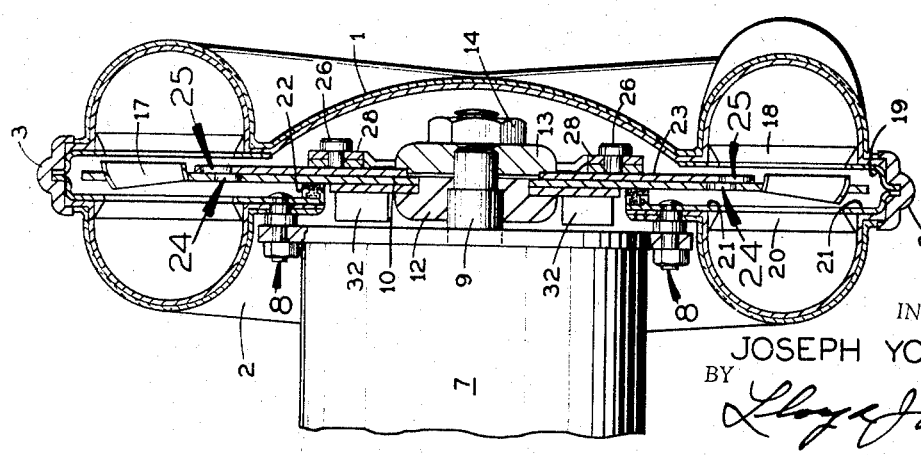
FIG. 5 is an enlarged fragmentary view taken through section line 5—5, FIG. 2.

It is to be noted that both inlet and outlet housings are intended to be formed from sheet material and coated on the outside surfaces thereof with one of several well known thermal insulating materials 16, as illustrated in cross section in FIGS. 4 and 5, for limiting the heat radiation from the turbine.

Figure 6:
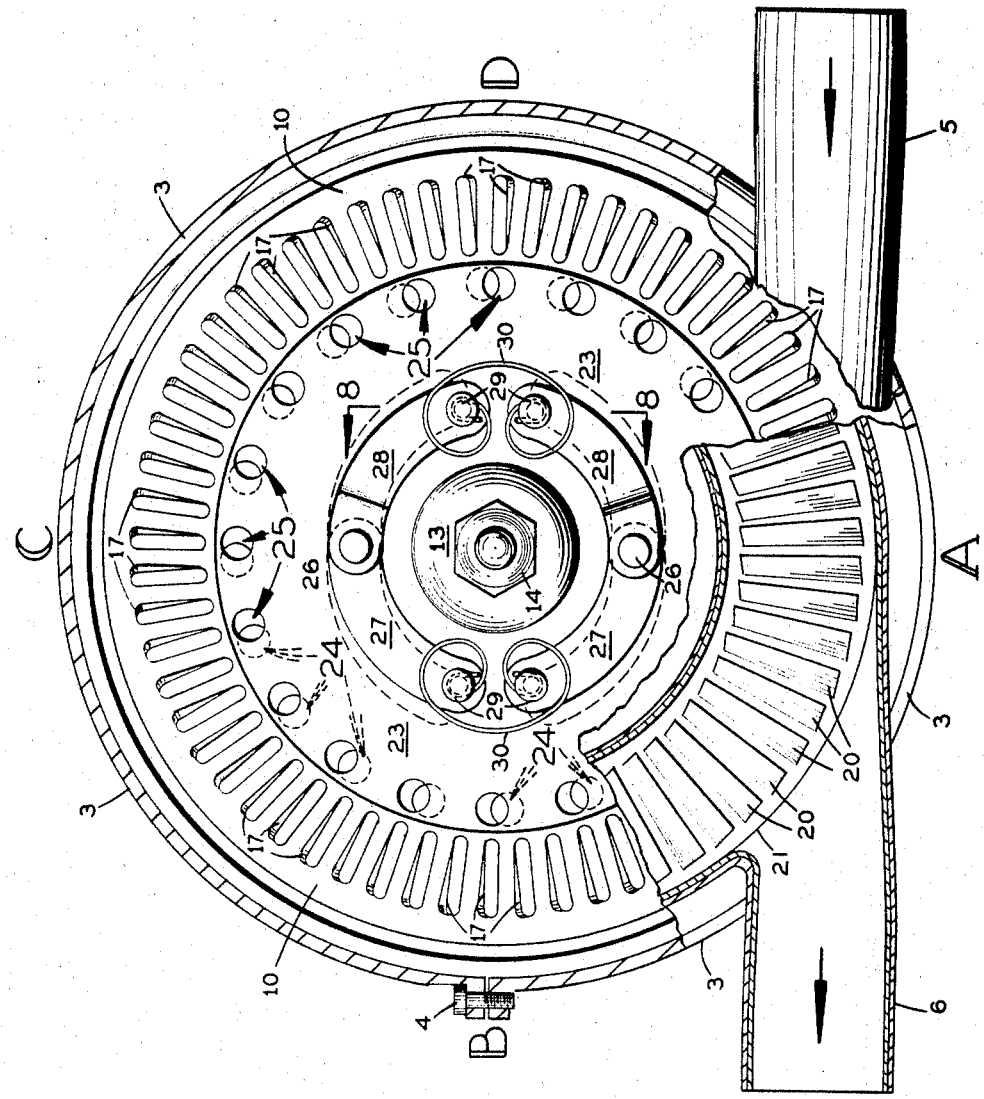
FIG. 6 is an enlarged cross sectional view taken through section line 6—6, FIG. 1, with a portion thereof broken away.

Referring to FIGS. 5 and 6, the outer peripheral portion of the rotor member 10 is formed into a plurality of integral radial equi-spaced oblique blades 17, which blades are formed into well known shape for a substantial transfer of energy from high velocity gas, to be hereinafter described. A like plurality of oblique radial input diffuser blades 18 are formed in circular diffuser plate 19, retained at its outer periphery by clamp ring 3 and the inner periphery by welding to housing 1 at the junction $x$, as indicated.

A like number of equi-spaced oblique radial exhaust diffuser blades 20 are formed in a diffuser plate 21, which is also retained around its outer periphery in ring 3 and around its inner periphery portion by screw means 8. A heat resistant sealing ring 22, such as the Graphitar type, is retained around the inner portion of diffuser plate 21 for frictional contact with the inside surface of rotor member 10, which will prevent the high velocity gas from escaping from housing 2, when the turbine is operated.

FIGS. 5 and 6 also show a means for controlling the speed of the rotor and generator 7 within a relatively small range when there are substantial variations in the velocity of gas through the turbine, which consist of a spoiler system comprising a circular spoiler plate 23 journalled for oscillation about a shoulder on hub 13, which plate is positioned adjacent and in frictional contact with the inlet side of the rotor member 10. The rotor member has a plurality of circular holes 24 in equi-spaced relation around the outer peripheral portion inside the blades thereof and the spoiler plate has a like number of like spaced holes 25 around the outer peripheral portion thereof, as shown in FIG. 6. It is now apparent that when the holes in the rotor and the holes in the spoiler plate coincide, a portion of the gas flowing through the turbine will bypass the rotor blades and thus not contribute to the torque of rotation of the rotor and conversely when the spoiler plate is displaced through a predetermined angle, covering the holes in the rotor, all of the gas entering the input housing will be directed through the input diffuser blades 18 and act upon the rotor blades 17.

The centrifugal means for controlling the displacement of the spoiler plate is best shown in FIGS. 5 and 6, which include a pair of shoulder studs 26 secured in the rotor member 10, also shown in FIG. 8, and a pair of links 27 and 28 retained on each stud 26, respectively, as shown. The free end of each link 27 and 28 terminates in a shoulder stud 29, and a torsion spring 30 terminates in opposite ends in a loop which is engaged to each adjacent stud 29 for normally urging the links into their inner positions for retaining the holes in the spoiler plate at one end of the like holes in the rotor, thus providing for predetermined rotor speed corresponding to predetermined input velocity of gas through the turbine.

Referring to FIG. 8, a pair of diagonally positioned opposite studs 29 are securely riveted in spoiler plate 23 with a clearance aperture 31 for the riveted heads in the rotor. Thus it is apparent that when the links 27 and 28 are centrifugally moved outward in proportion to the speed of the rotor against the restraining action of spring 30, then the holes 25 in the spoiler plate will move over the holes 24 in the rotor and permit a corresponding proportionate amount of gas in the inlet housing to bypass the rotor blades 17, thus establishing a substantially constant speed of the rotor within certain limitations of variations of the velocity of the input gas into the turbine.

Referring to FIG. 7, the inner side of the fan member 15 shows the inner side of the blades 32 secured therein and an elevational view of the exhaust diffuser blades 20, as well as the rotor member 10, as related to the spoiler plate adjacent to the opposite side thereof.

In the event the centrifugal spoiler device is not required because of relatively constant velocity gas through the turbine, the spoiler plate 23 is adjustably secured to the rotor member 10 by a shoulder screw 33 threaded into the rotor member through an adjustment slot 34, as shown in FIGURES 11 and 12. Thus the holes 25 may be permanently adjusted with relation to the holes 24 to maintain a desired speed of the rotor.

FIG. 9 diagrammatically illustrates a development of the circular rotor and diffuser blades around the turbine from line A, through C, D, and B and back to A, as noted on FIG. 6. The heavy arrows illustrate the input of gas and the small arrows indicate the flow of gas through the inlet diffuser for impingement against the rotor blades and the guiding effect of the exhaust diffuser for conducting the de-energized gas to the outlet, illustrated by heavy arrow. The entire exhaust system is shown diagrammatically in FIG. 10, wherein a typical internal combustion engine exhaust manifold 35 is connected to a main conduit 36, which is connected to the inlet connection 5 of the inlet housing 1 of the turbine. The outlet connection 6 thereof is connected to an exhaust or tail pipe 37, which leads to the atmosphere.

A metered nozzle 38 is secured in coaxial venturi-like relation in conduit 36 and connected to a small conduit 39 with the end thereof terminating in the upper portion of the crankcase of an engine. A second nozzle 40 is connected venturi-like in conduit 36 to a small conduit 41 which runs to a two way electro-magnetic valve 42, as shown, which valve has an air inlet 43 and a fuel inlet 44 and is operated by an electric valve solenoid 45, to be hereinafter described.

A conical glow plug including an electric heating element 46, preferably having chrome steel outer armor thereon, is retained in an opening in conduit 36 and in coaxial alignment with nozzle 40 by thermal electric insulation 47. A conventional thermal thermostat 48, having normally closed contacts therein is positioned against the turbine casing for heat transfer thereby.

When the ignition surface of the glow plug is positioned in near proximity to the engine manifold, the flame therein will normally maintain temperature of the plug sufficiently high to maintain ignition of the noxious gases; however, the efficiency of the glow plug may be enhanced, particularly when located at a greater distance from the exhaust manifold, by a coating thereon of various heat radiating substances, such as barium oxide.

Conductors $L_1$ and $L_2$ represent the output terminals of the generator driven by the turbine. A battery 49 has one terminal connected to ground by a conductor 50 and the remaining terminal 51 connected to one terminal of ignition switch 52 and to the ignition circuit of the engine, not shown. The remaining terminal of switch 52 is connected to one terminal of normally closed thermostat switch 53. The remaining terminal of the switch is connected to one terminal of the heating element 46 by a conductor 54, and is also connected to one terminal of the electric valve solenoid 45. The remaining terminal of the solenoid is connected to ground by conductor 55.

In operation and assuming that the manifold 35 is conducting the normal products of combustion of an internal combustion engine, which include noxious gases, raw fuel, together with the normal burned products, then the nozzle 38 will create in conduit 39 a partial vacuum which will withdraw noxious gases from the crankcase of the engine to which it is connected. Then under the assumption that the ignition switch 52 is closed, the heater element 46 will be energized to a point of red heat and simultaneously, the solenoid 45 will be energized and operate valve 42 to permit a predetermined small metered amount of fuel, preferably gasoline, to enter the valve through conduit 44, which is connected to a source of fuel, not shown. This fuel will mix with air drawn into air inlet 43 by nozzle 40 and the mixture will flow through conduit 41 and impinge against the heating element 46 by virtue of the partial vacuum formed by the nozzle 40.

The resultant combustion maintained by the incoming air will burn noxious gases, such as carbon monoxide, into carbon dioxide and reduce other hydro carbons and unburned fuel to non-noxious gas and amplify the energy in the exhaust gas, which is then directed into the turbine input and the energy therein absorbed by the rotor thereof, resulting in reduced gas pressure and velocity which will rotate the generator and produce auxiliary electric power. The spent gases leaving the outlet connection 6 are conducted to the atmosphere by exhaust pipe 37. It is to be noted that the introduction of fuel into conduit 44 in most cases need only be used for starting purposes. When the temperature of the heating element 46 is raised sufficiently high to burn the noxious gases, the temperature of the turbine will also be raised to a predetermined degree and will open the switch 53 and de-energize the circuit to the heater element. Since the heater element will be in the path of flame or high temperature gas from the conduit 36, the temperature will remain sufficiently high without electric energy to continue the combustion of the noxious gases in the presence of the injection of air from the air nozzle 40.

Another feature of the turbine operation resides in the rapid inter-mixture of all gases entering the multi-blade turbine which augments the combustion of the noxious unburned products from the afterburner.

It is to be noted that the gas leaving the engine manifold is formed into a sequence of high pressure pulses of high acoustic level corresponding with the function of each cylinder of the engine, which pulses normally require a muffler device in the exhaust system, to permit expansion and diffusion of the pulses to minimize the acoustical output in the exhaust outlet or tail pipe.

The turbine positioned immediately following the afterburner effectively replaces the need for a muffler device since the multi-blade construction of both the inlet and outlet diffuser blades and rotor blades of the turbine when operating will break up each large pulse of exhaust gas from the manifold and afterburner into an expanded flow of gas with a resultant multitude of small pulses, which effectively reduce the accoustical output from the tailpipe to a value considerably below that of conventional mufflers.

It is also to be noted that when the aforesaid afterburner and turbine combination is used in the exhaust system of an engine with a high ratio of unburned products in the exhaust thereof, such as a diesel engine operated on low grade fuel, then a constant injection of a small flow of gasoline through nozzle 38 may be required to maintain combustion of substantial quantities of the noxious components of the exhaust gases.

It is understood that certain modifications in the above construction, utilizing the features described, are intended to come within the scope of the appended claims.

Having described my invention, I claim:

1. An exhaust system for connection to the outlet of an exhaust manifold of an internal combustion engine comprising a gas turbine means having an input and an outlet passage connection,
   a main conduit connecting the said outlet of said manifold and the input connection of said turbine for conducting exhaust gases from said manifold into said turbine means,
   a glow plug means positioned in said main conduit for igniting unburned noxious products in said exhaust gases conducted by said conduit when energized to a predetermined ignition temperature,
   a nozzle sealed through the wall of said conduit with the internal portion substantially coaxial therewith and projecting in the direction of the flow of exhaust gases in said conduit with the outlet end of said nozzle positioned to direct the output thereof toward said glow plug means,
   a source of highly combustible fuel,
   a two position valve means having an atmospheric air inlet and a fuel inlet and outlet connected to said nozzle,
   said fuel inlet connected to said source of fuel,
   said valve means normally in a first position to permit said nozzle to withdraw atmospheric air therethrough from the air inlet thereof and to withdraw a predetermined mixture of said fuel and said air when said valve means is moved to its second position to start or maintain combustion of the combustible components of said exhaust gases,
   an auxiliary power driven device connected to and constructed and adapted to be driven by said turbine means whereby the flow of exhaust gases from said manifold including unburned said noxious products will induce air or said fuel mixture thereof by partial vacuum through said nozzle into said conduit for impingement against said glow plug means when heated to support the combustion of said products into non-noxious gas and whereby the exhaust gases including the gas products of the glow plug combustion will drive said turbine and the total expanded gases will be ejected from said outlet passage of said turbine and said device will simultaneously be driven to perform useful work.

2. An exhaust system for connection to the outlet of an exhaust manifold of an internal combustion engine comprising a gas turbine having an inlet and an outlet passage connection,
   an electric generator for producing electric power when rotated, said turbine including a multi-blade rotor journalled for rotating said generator and including a fixed multi-blade input diffuser means for supplying gases to said rotor blades from said inlet connection and a fixed multi-blade diffuser means for conducting said gases from said rotor into said outlet connection,
   a main conduit connecting the said outlet of said manifold and the input connection of said turbine for conducting exhaust gases from said manifold into said turbine,
   a glow plug positioned in said main conduit for igniting unburned noxious products in said exhaust gases conducted by and impinged thereon by said conduit when energized to a predetermined ignition temperature,
   an air nozzle sealed through the wall of said conduit with the internal portion thereof projecting in the direction of flow of the exhaust gases in said conduit with the outlet end thereof positioned to direct the output thereof toward said glow plug,
   a source of highly combustible fuel,
   a two positioned valve means having an air inlet and a fuel inlet and outlet connected to said nozzle,
   said fuel inlet connected to said source of fuel,
   said valve means normally in a first position to permit said nozzle to withdraw atmospheric air therethrough from the said air inlet thereof and to withdraw a predetermined mixture of said fuel and said air when said valve means is moved to its second position to start or maintain combustion of the combustible components of said exhaust gases whereby the pulsating flow of exhaust gases from said manifold including unburned said noxious products will induce air or said fuel mixture thereof by partial vacuum through said nozzle into said conduit for impingement against said glow plug when heated to support the combustion of said products into non-noxious gas and whereby the exhaust gases including the gas products of the glow plug combustion will rotate said rotor and said electric generator for producing electric power and whereby the total expanded exhaust gases will be ejected from said outlet passage of said turbine with the said pulsating flow reduced to a plurality of small pulsations having a low muffled acoustical output.

3. The construction recited in claim 2 including a second nozzle sealed through the wall of said main conduit with the inner end portion projecting in the direction of the flow of exhaust gas therein and the outer end thereof connecting a second conduit with the opposite end thereof terminating in the upper portion of the crank case of said internal combustion engine for conducting noxious gas from said crank case into said main conduit and against said glow plug for the ignition and combustion thereof.

4. The construction recited in claim 2 including an electric heating element operatively associated with said glow plug,
   a source of electric energy,
   a circuit means connecting said electric circuit means and said source of power including a normally open electric switch in series therewith whereby the temperature of said glow plug may be raised to said ignition temperature by closing said electric switch for starting the combustion of said noxious gas impinged on said glow plug from said manifold.

5. In an exhaust system of the character described a gas turbine having a casing consisting of an inlet housing and an outlet housing secured adjacent thereto with a circular rotor member having a plurality of rotor blades around the periphery thereof and journalled for coaxial rotation in said casing about a principal axis,
   means forming an inlet port in said inlet housing and means forming an outlet port in said outlet housing,
   a circular inlet diffuser plate secured in said inlet housing in spaced relation thereto and adjacent said rotor member including a plurality of integral diffuser blades positioned in close proximity with said rotor blades,
   an outlet diffuser plate secured in said outlet housing in spaced relation thereto and adjacent the opposite side of said rotor member having a plurality of blades around the periphery thereof positioned in close proximity to said rotor blades,
   said rotor member having a predetermined number of spaced apertures therethrough,
   a spoiler plate secured for coaxial oscillation about said axis in frictional contact with one side of said rotor member with said plate having a like said number of said apertures therethrough positioned to correspond to said apertures in said rotor member when the latter is rotated through an angle with respect to said rotor member from a non-bypass to a full bypass position,
   adjustable fastening means associated with said rotor member and said spoiler plate for the rotational adjustment of said spoiler plate about said axis with respect to said rotor member for adjusting the effective open area of the passageway through corresponding apertures in said rotor member with respect to corresponding said apertures in said spoiler plate whereby exhaust gas of predetermined velocity entering into said inlet housing will be diffused by said diffuser plate and impinge upon said rotor blades and rotate said rotor member and whereby the expanding gas from the said rotor blades will be diffused through the blades of said outlet diffuser plate into said outlet housing and from said outlet port and whereby a portion of said gas in said inlet housing will bypass said rotor blades into said outlet housing dependent upon the adjustment of said spoiler plate with respect to said rotor member.

6. In an exhaust system of the character described a gas turbine having a casing consisting of an inlet housing and an outlet housing secured adjacent thereto with a circular rotor member having a plurality of rotor blades around the periphery thereof and journalled for coaxial rotation in said casing about a principal axis,
   means forming an inlet port in said inlet housing and means forming an outlet port in said outlet housing,
   a circular inlet diffuser plate secured in said inlet housing in spaced relation thereto and adjacent said rotor member including a plurality of integral diffuser blades positioned in close adjacent proximity with said rotor blades,
   an outlet diffuser plate secured in said outlet housing in spaced relation thereto and adjacent the opposite side of said rotor member having a plurality of blades around the periphery thereof positioned in close adjacent proximity to said rotor blades,
   said rotor member having a predetermined number of spaced apertures therethrough,
   a spoiler plate secured for coaxial oscillation about said axis in frictional contact with one side of said rotor member with said plate having a like said number of said apertures therethrough positioned to correspond to said apertures in said rotor member when the latter is rotated through a predetermined angle with respect to said rotor member from a non-bypass position to a full bypass position,
   centrifugal governor means operatively associated with said rotor member and said spoiler plate for rotating said spoiler plate with reference to said rotor member in proportion to the velocity of rotation of the latter by increasing and decreasing the passageway through corresponding apertures in said rotor member with respect to corresponding said apertures in said spoiler plate when exhaust gas of variable velocity entering said inlet housing will be diffused by said diffuser plate and impinge upon said rotor plate and rotate said rotor member and whereby the expanding gas from said rotor blades will be diffused through the blades of said outlet diffuser plate into said outlet housing and from said outlet port and whereby variable portions of said exhaust gas in said inlet housing will bypass said rotor blades through said apertures into said outlet housing dependent upon the velocity of said gas entering said input port for maintaining the rotation of said rotor member at a substantially constant velocity.

7. The construction recited in claim 6 including a conduit connecting the exhaust outlet of an internal combustion engine to said inlet port of said gas turbine,
   an air inlet nozzle sealed through the wall of said conduit and projecting in the direction of flow of the said exhaust gases for inducing atmospheric air into said conduit,
   a glow plug means positioned in said conduit in the path of air from said nozzle adapted and constructed to be heated by the energy in the exhaust gases flowing through said conduit to a predetermined temperature for igniting and burning in the presence of air drawn into said conduit by said nozzle the noxious products in said exhaust gases into non-noxious products of combustion and increasing the gas pressure entering said inlet port and increasing performance of said turbine and minimizing the pollutants in said atmosphere.

8. In an exhaust system of the character described a means forming a turbine housing having an inlet and an outlet side in an inlet port in said inlet side and an outlet port in said outlet side,
   a circular rotor disc having a plurality of rotor blades in the outer peripheral portion thereof journalled for rotation in said housing positioned between said inlet and outlet side thereof,
   a ring shaped diffuser plate secured in said inlet side of said housing in spaced relation thereto and in close proximity to said rotor disc including a plurality of fixed diffuser blades positioned adjacent said rotor blades for directing exhaust gases entering said inlet port into the inlet side of said housing against said rotor blades for rotating said rotor disc,
   said rotor disc having a plurality of holes therethrough for bypassing said gases directly from said input to said output side of said housing, a spoiler plate frictionally retained for oscillatory movement against one side of said rotor disc, a plurality of holes through said spoiler plate corresponding in number and position to the said holes in said rotor disc, a plurality of centrifugal link means operatively associated with said rotor disc and said spoiler plate for rotating said plate a predetermiend angle in forward direction with respect to said disc for forming a variable bypass passage through said holes between said input and said output sides of said housing when said link means are acted upon by centrifugal force by the rotation of said disc, spring means operatively associated with said links for normally urging said spoiler plate in reverse direction to close said passageway formed by said holes whereby exhaust gas of variable velocity entering said inlet port will divide a predetermined ratio through said diffuser blades for rotating said rotor disc and through said holes for bypassing a portion of the gas for maintaining a relatively constant speed of said rotor disc.

References Cited

UNITED STATES PATENTS

| 1,304,928 | 5/1919 | Anderson | 60—30 |
| 2,203,554 | 6/1940 | Uhri | 60—30 |
| 2,835,470 | 5/1958 | Trowbridge | 253—39 |
| 2,962,257 | 11/1960 | Allingham | 253—39 |
| 2,995,890 | 8/1961 | Dolza | 60—13 |
| 3,038,552 | 6/1962 | Hedblom | 60—30 |

FOREIGN PATENTS

| 1,012,365 | 4/1952 | France. |
| 1,128,505 | 8/1956 | France. |
| 1,175,272 | 11/1958 | France. |

CARLTON R. CROYLE, *Primary Examiner.*

DOUGLAS HART, *Assistant Examiner.*

U.S. Cl. X.R.

60—30; 253—59